US00RE35628E

United States Patent [19]

Ohkubo et al.

[11] E Patent Number: Re. 35,628

[45] Reissued Date of Patent: Oct. 14, 1997

[54] REDUCED HEIGHT TAPE DRIVER

[75] Inventors: Hiroshi Ohkubo; Takashi Miyamoto, both of Musashino, Japan

[73] Assignee: Teac Corporation, Japan

[21] Appl. No.: 287,420

[22] Filed: Aug. 9, 1994

Related U.S. Patent Documents

Reissue of:

[64] Patent No.: 5,277,352
Issued: Jan. 11, 1994
Appl. No.: 931,446
Filed: Aug. 20, 1992

U.S. Applications:

[63] Continuation of Ser. No. 768,336, Sep. 30, 1991, abandoned, which is a continuation of Ser. No. 558,487, Jul. 27, 1990, abandoned.

[30] Foreign Application Priority Data

Sep. 20, 1989 [JP] Japan ..... 1-109879

[51] Int. Cl.[6] ..... G11B 15/26

[52] U.S. Cl. ..... 226/188; 242/352.4

[58] Field of Search ..... 226/181, 182, 226/183, 186, 187, 188; 242/342, 349, 352.3, 352.4; 360/90, 93, 96.3

[56] References Cited

U.S. PATENT DOCUMENTS

| | | | |
|---|---|---|---|
| 3,373,951 | 3/1968 | Mazoyer . | |
| 3,526,371 | 9/1970 | Blackie et al. . | |
| 3,851,842 | 12/1974 | Bastiaans . | |
| 3,913,814 | 10/1975 | Suzuki | 226/187 |
| 3,924,823 | 12/1975 | Cohen et al. | 242/352.4 |
| 3,976,262 | 8/1976 | Kennedy | 360/93 |
| 3,993,259 | 11/1976 | Lace | 226/182 |
| 4,025,027 | 5/1977 | Francolini | 226/181 |
| 4,055,288 | 10/1977 | Lace | 226/182 |
| 4,183,477 | 1/1980 | Iwase et al. | 360/94 |
| 4,189,079 | 2/1980 | Uehara | 226/188 |
| 4,573,091 | 2/1986 | Barton, Jr. et al. | 360/93 |
| 4,647,994 | 3/1987 | Irwin et al. | 360/85 |
| 4,711,410 | 12/1987 | Gwon . | |
| 4,723,184 | 2/1988 | Takai et al. | 360/96.3 |
| 4,739,951 | 4/1988 | Zeavin . | |
| 4,836,465 | 6/1989 | May et al. | 360/96.4 |
| 4,863,114 | 9/1989 | Moeller et al. | 360/74.6 |
| 4,982,911 | 1/1991 | Newell | 360/96.3 |
| 4,984,111 | 1/1991 | Rudi | 360/96.5 |
| 5,081,551 | 1/1992 | Aruga | 360/97.01 |
| 5,210,664 | 5/1993 | Perona | 360/93 |

FOREIGN PATENT DOCUMENTS 52-14976 4/1977 Japan .

*Primary Examiner*—John P. Darling

[57] ABSTRACT

A tape driver for use in a tape recorder or similar devices which use a data cartridge provided with a drive roller. The tape driver including a motor unit laterally disposed relative to the data cartridge and an idler located between the motor unit and the drive roller on the data cartridge such that the motor unit rotates the drive roller through the idler. Alternatively, a pulley rotated by the laterally located motor unit is used to directly rotate the drive roller.

11 Claims, 4 Drawing Sheets

REDUCED HEIGHT TAPE DRIVER

Matter enclosed in heavy brackets [ ] appears in the original patent but forms no part of this reissue specification; matter printed in italics indicates the additions made by reissue.

The present application is a continuation of patent application Ser. No. 07/768,336, filed on Sep. 30, 1991, now abandoned, which in turn is a continuation of patent application Ser. No. 07/558,487, filed on Jul. 27, 1990 now abandoned.

BACKGROUND OF THE INVENTION

The present invention relates to a tape driver for use in a tape recorder or similar devices which use a data cartridge having a drive roller.

Presently, tape recorders and similar devices use a data cartridge which contains magnetic tape wound on a pair of reels. The data cartridge provides a drive roller which is coupled to the reels by a drive belt.

A conventional tape driver includes a pulley mounted on the rotary shaft of a motor. The motor is located under the data cartridge when the data cartridge is loaded into the tape recorder. A conventional tape driver rotates the drive roller so as to turn the reels and run the magnetic tape as disclosed in Japanese Patent Application Examined Publication No. 14976/77.

As presently configured the height of a tape recorder or similar device cannot be made less than the sum of the thickness of the data cartridge and the height of the motor in a conventional tape driver. Furthermore, the close proximity of the motor to the magnetic head adversely affects performance.

SUMMARY OF THE INVENTION

An object of the present invention is to reduce the minimum height of a tape recorder or similar device employing a tape driver and a data cartridge.

Another object of the present invention is to locate a tape driver in a tape recorder in a position lateral to the data cartridge such that combined height of the tape driver and data cartridge is reduced.

Another object of the present invention is to reduce the adverse effects of the motor on the magnetic head by increasing the separation of the motor and magnetic head.

These and other objects are accomplished by a tape driver for engaging a drive roller provided in a data cartridge to rotate the drive roller to run magnetic tape contained in the data cartridge, comprising a motor unit laterally disposed relative to the data cartridge and an idler located between the motor unit and the drive roller, wherein the motor unit rotates the drive roller through the idler.

Alternatively, these and other objects are accomplished by a tape driver for engaging a drive roller provided in a data cartridge to rotate the drive roller to run magnetic tape contained in the data cartridge, comprising a motor unit laterally disposed relative to the data cartridge and means rotatably driven by the motor unit for directly rotating the drive roller.

BRIEF DESCRIPTION OF THE DRAWINGS

The accompanying drawings, which are incorporated in and constitute part of the specification, illustrate a presently preferred embodiment of the invention, and together with the general description given above and the detailed description of the preferred embodiment given below, serve to explain the principles of the invention.

DESCRIPTION OF THE PREFERRED EMBODIMENT

A preferred embodiment of this invention will be described with reference to the accompanying drawings.

Figure 1:
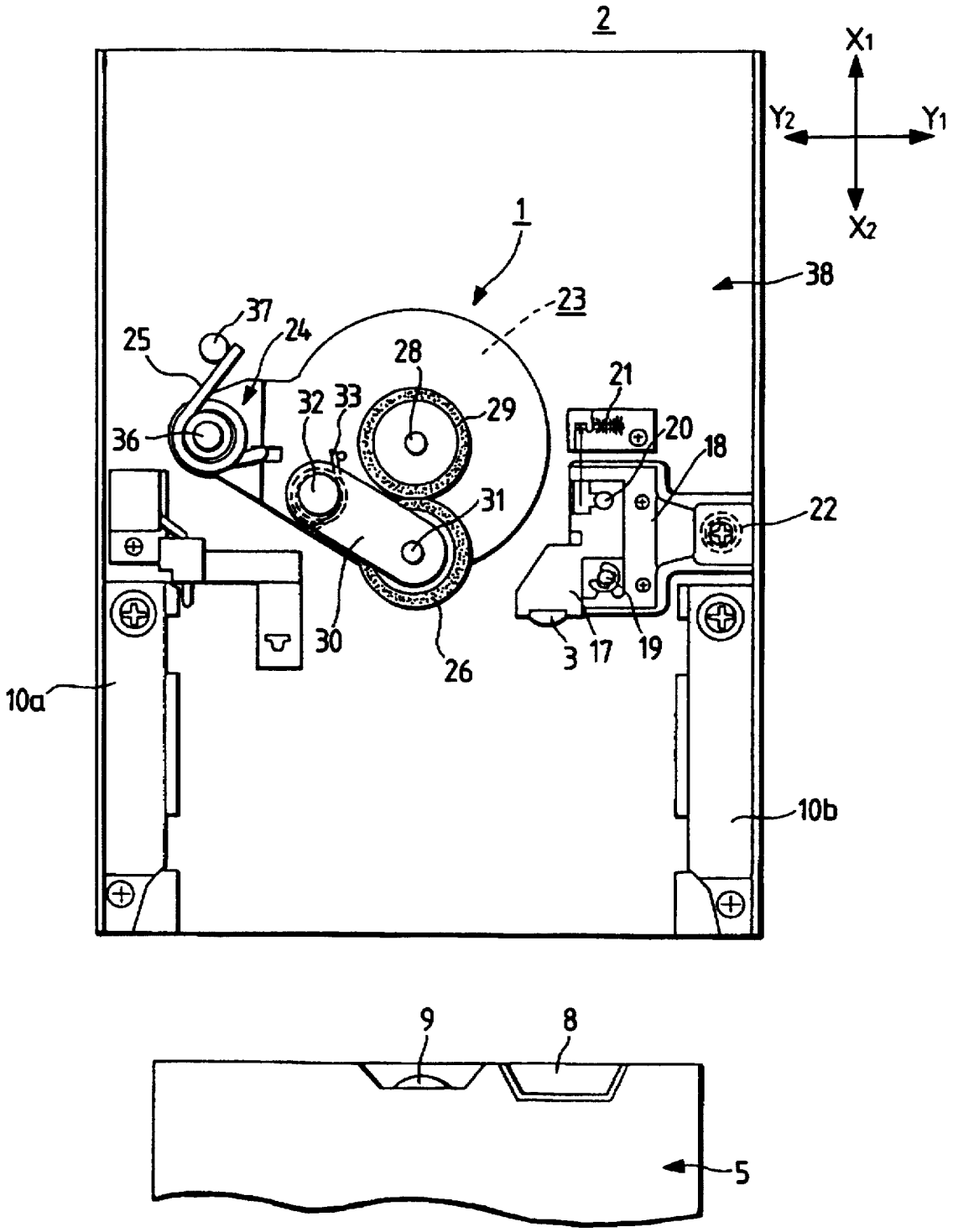
FIG. 1 is a plan view of a tape recorder employing a tape driver which is an embodiment of the present invention.

FIG. 1 shows a tape recorder 2 employing a tape driver 1 which is an embodiment of the present invention. The components of the tape driver 1 are all disposed on the top of the chassis 38. The tape recorder 2 includes in addition to tape driver 1, a magnetic head 3, and a data cartridge load/unload mechanism not shown in the drawings. The magnetic head 3 attaches to a head holder 17 which is supported by pins 19 and 20 planted in a base 18. The head holder 17 and base 18 can be moved up and down, but are urged by helical springs 21 and 22 such that magnetic head 3 is stably held once positioned. A data cartridge 5 is removably loaded in the tape recorder 2 such that magnetic recording or reproduction is performed.

Figure 2:
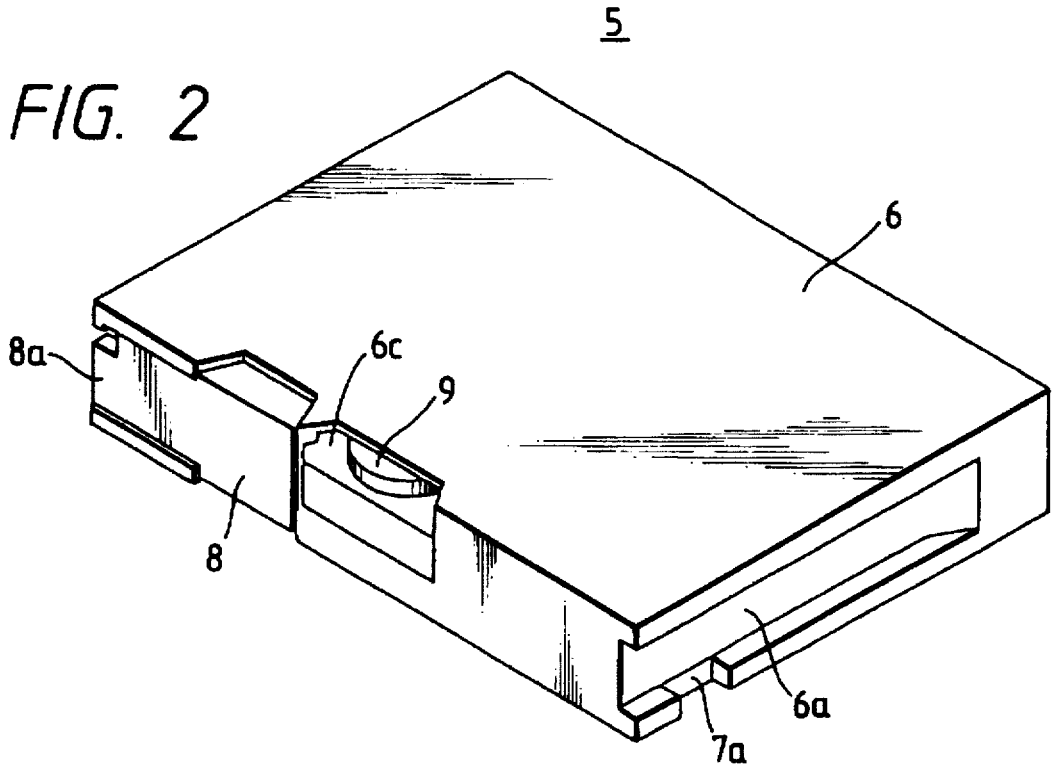
FIG. 2 is a perspective view of a data cartridge to be loaded in the tape recorder.
Figure 3:
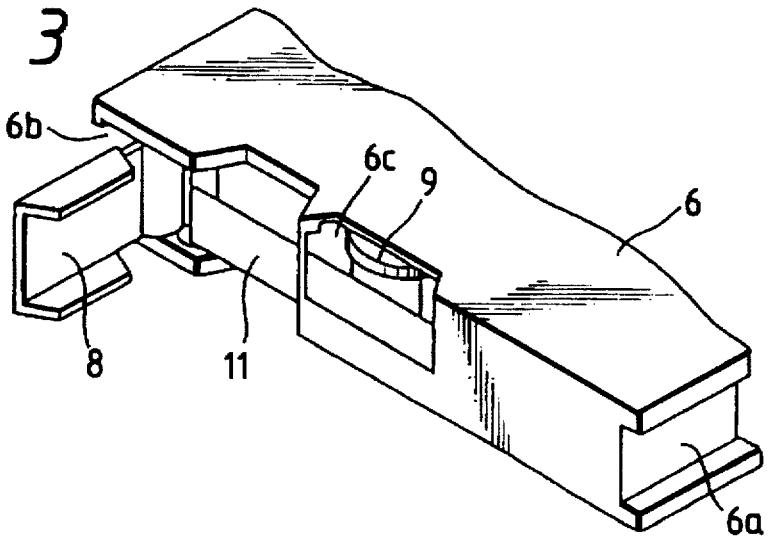
FIG. 3 is a perspective view of the front of the data cartridge.

FIG. 2 shows the data cartridge 5. The cassette-like body 6 has guide grooves 6a and 6b along the side and locking notches 7a and 7b towards the lower front. The data cartridge 5 includes a rotatably attached door 8 on the front which is usually closed to prevent dust from entering into the body 6. When the data cartridge 5 is loaded in the tape recorder 2, the end 8a of the door 8 is engaged with the guide rail 10b shown in FIG. 1, so that the door is opened to expose magnetic tape 11 as shown in FIG. 3. The data cartridge 5 also incudes a drive roller 9 located at notch 6c on the front as shown in FIG. 3.

Figure 4A:
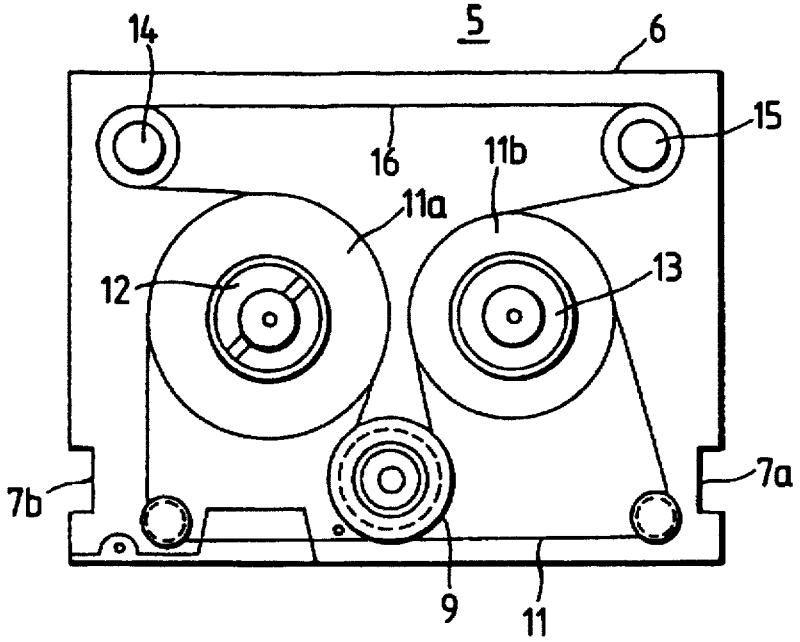
FIGS. 4A and 4B are schematic illustrations of the inside of the data cartridge.
Figure 4B:
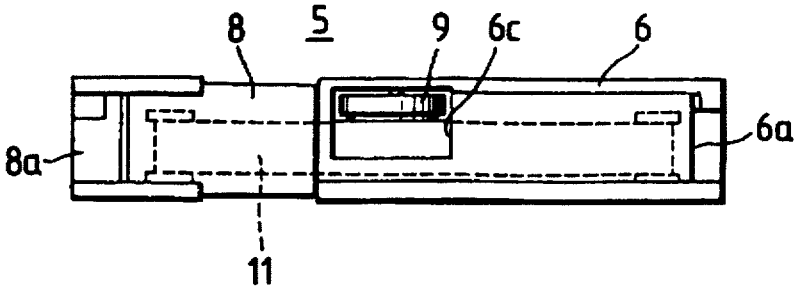

FIG. 4 shows the interior of the data cartridge 5 and a pair of reels 12 and 13 on which magnetic tape 11 is wound. A drive belt 16 fits tightly on the drive roller 9 and guide rollers 14 and 15 and extends between the drive roller 9 and guide rollers 14 and 15 so as to contact the peripheral surfaces of magnetic tape windings 11a and 11b on the reels 12 and 13 respectively. As the drive roller 9 rotates, the drive belt 16 revolves around the drive roller 9 and guide rollers 14 and 15. The drive belt 16 turns the magnetic tape windings 11a and 11b so that the reels 12 and 13 rotate and run the magnetic tape 11.

Figure 5:
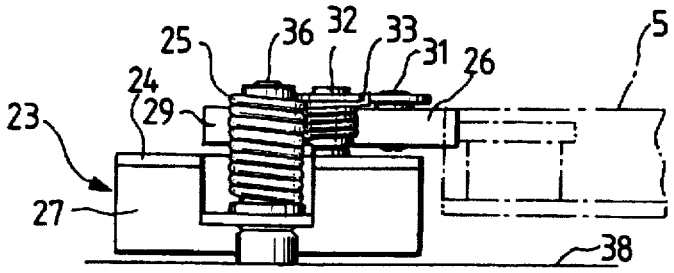
FIG. 5 is a side view of the tape driver.

As shown in FIGS. 1 and 5, the tape driver 1 includes motor unit 23, base 24, torsion spring 25, and idler 26. The motor unit 23 includes motor 27, rotary shaft 28, and pulley 29. The motor 27 mounts on the base 24 which is pivotally coupled to pin 36 planted in chassis 38. The torsion spring 25 fits onto the pin 36 and engages pin 37 on one end and the base 24 on the other end. The torsion spring 25, thus urges the base 24 to turn clockwise about the pin 36. When the data cartridge 5 is not loaded in the tape recorder 2, a stopper mechanism provided under the motor unit 23, but not shown in the drawings, restricts the turn of the base 24 to the position of FIG. 1. Pin 31 which is planted in one end of arm 30 rotatably supports idler 26. Pin 32 planted in the base 24 pivotally couples the other end of the arm 3O. Torsion spring 33 fits onto the pin 32 and engages the base 24 on one end and the arm 30 on the other end. The torsion spring 33, thus urges the arm 30 by a weak force to turn counterclockwise about the pin 32.

Figure 6:
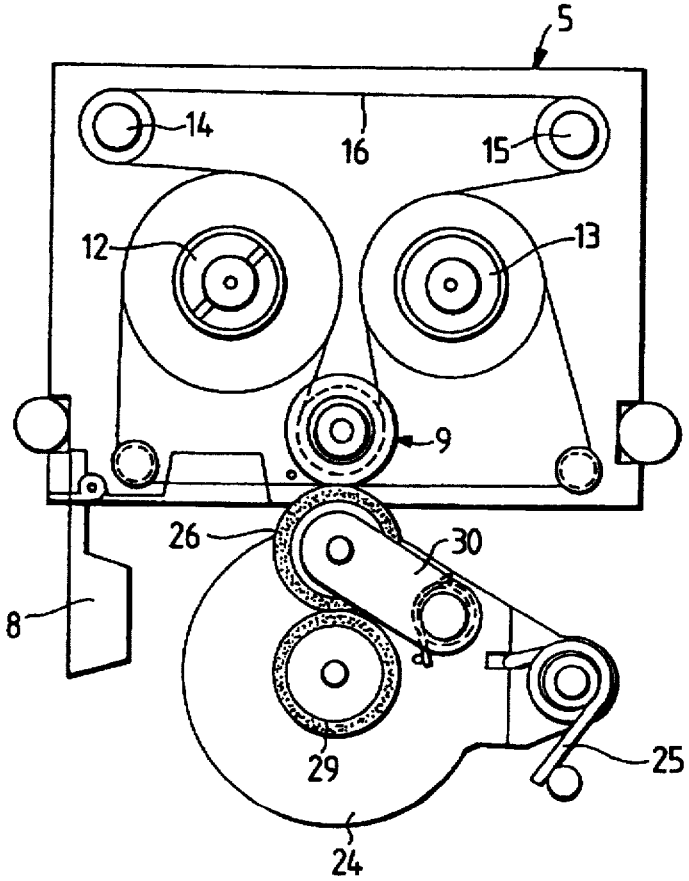
FIG. 6 shows the positional relationship between the tape driver and the data cartridge when the data cartridge is loaded in the tape recorder.

As shown in FIG. 6, when the data cartridge 5 is loaded in the tape recorder 2, the drive roller 9 contacts idler 26 which is pressed against pulley 29. In this state the drive roller 9 exerts a slight counterclockwise force on the base 24 against the urging of torsion spring 25. As a result, the pulley 29 which is attached to motor unit 23 is pressed against the idler 26 by a pushing force corresponding to the urging force of the torsion spring 25, and the idler 26 is pressed against the driver roller 9 by an appropriate pushing force. The torque of the motor unit 23 is thereby transmitted to the drive roller 9 through the medium of the idler 26.

The idler 26 places the motor unit 23 lateral to the data cartridge 5 which is typically limited to a height no less than the sum of the thickness of the data cartridge and the height of the body of the motor. As a further result of the lateral placement of the motor unit 23 to the data cartridge 5, the motor 27 is placed further away from the magnetic head 3. Increased distance between the motor 27 and the magnetic head 3 diminishes the adverse influence of the motor on the magnetic head and facilitates shielding of the magnetic head. Finally, the above-described embodiment allows the shaft of the motor unit 23 to be shortened.

The diameter of the pulley 29 may be increased to directly rotate the drive roller 9. However, in the above-described embodiment the idler 26 is provided to reduce the diameter of pulley 29 which rotates the drive roller 9 at high rotary power through the medium of idler 26.

Additional advantages and modifications will readily occur to those skilled in the art. The invention in its broader aspects is therefore not limited to the specific details, representative apparatus and illustrative examples shown and described. Accordingly, departures may be made from such details without departing from the spirit or scope of applicants' general inventive concept.

What is claimed is:

1. A tape driver for engaging a drive roller fixed in a data cartridge to rotate a drive belt operably connected to the fixed drive roller to run tape contained in the data cartridge, comprising:

a pivotally mounted driver assembly laterally disposed relative to the data cartridge, comprising;

a base capable of pivotal movement;

a motor unit mounted on said base; and an idler pivotally mounted on said base and provided between said motor unit and the fixed drive roller in the data cartridge;

wherein said motor unit rotates the fixed drive roller upon pivotal engagement of said driver assembly with the fixed drive roller through said idler, such that the drive belt is rotated and tape is run.

2. The tape driver according to claim 1, wherein said base is urged toward said fixed drive roller by a spring.

3. The tape driver according to claim 1, wherein said idler is urged toward said motor unit by a spring.

4. The tape driver according to claim 1, wherein said motor unit comprises a pulley.

*5. A tape driver for engaging a drive roller fixed in a data cartridge to rotate a drive belt operably connected to the fixed drive roller to run tape contained in the data cartridge, comprising:*

*a chassis for receiving the data cartridge with the fixed drive roller presented on one side thereof;*

*a base supported by the chassis to be disposed laterally from and to be movable toward said one side of the data cartridge;*

*a motor unit mounted on said base; and*

*an idler supported by a lever pivoted relative to said base, the idler being positioned between said motor unit and the fixed drive roller in the data cartridge;*

*said motor unit rotating the fixed drive roller through said idler upon relative movement of the base and the data cartridge toward each other, such that the drive belt is rotated and tape is run.*

*6. The tape driver according to claim 5, wherein said idler is movable relative to said motor unit in a space located above a part of said motor unit.*

*7. The tape driver according to claim 6, wherein said base is pivotally mounted on said chassis.*

*8. The tape driver according to claim 7, wherein said base is urged toward said fixed drive roller by a spring.*

*9. The tape driver according to claim 8, wherein said lever is biased by another spring to urge said idler toward said motor unit.*

*10. The tape driver according to claim 9, wherein said lever is pivotally mounted on said base.*

*11. The tape driver according to claim 6, wherein said motor comprises a pulley to engage and drive the idler.*

* * * * *